US000001107H

United States Statutory Invention Registration [19]

[11] Reg. Number: H1107

Wehner

[43] Published: Sep. 1, 1992

[54] LOW PROBABILITY OF INTERCEPT RADAR USING ATMOSPHERIC LOSS

[75] Inventor: Donald R. Wehner, San Diego, Calif.

[73] Assignee: The United States of America as represented by the Secretary of the Navy, Washington, D.C.

[21] Appl. No.: 805,559

[22] Filed: Jun. 6, 1977

[51] Int. Cl.[5] ..... G01S 7/02
[52] U.S. Cl. ..... 342/13; 342/26
[58] Field of Search ..... 343/18 E; 342/13, 200

[56] References Cited

U.S. PATENT DOCUMENTS 3,098,225 7/1963 Anderson ..... 343/112 D X
3,866,224 2/1975 Porter et al. ..... 343/18 E X
4,064,458 12/1977 DeLoach, Jr. ..... 343/7 VM X

OTHER PUBLICATIONS

Schlesinger, R. J., "Principles of Electronic Warfare" Prentice-Hall, Inc., 1961, p. 144.

*Primary Examiner*—Bernarr E. Gregory

*Attorney, Agent, or Firm*—Harvey Fendelman; Thomas Glenn Keough

[57] ABSTRACT

A low probability of intercept radar apparatus and technique involving operation at the lower water vapor absorption resonance frequency of 22.2 GHz wherein the radar beam is shaped such that it is restricted to low altitude and short range coverage. The system is implemented by conventional radar techniques with the exception of the technique disclosed herein of operating at the lower water vapor absorption frequency in combination with utilizing a rotating shaped beam antenna system that restricts the radar beam to low altitude and short range coverage.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW PROBABILITY OF INTERCEPT RADAR USING ATMOSPHERIC LOSS

BACKGROUND OF THE INVENTION

Currently, ships and task group movements cna be detected by a hostile interceptor using relatively simple receivers in aircraft and satellites. Detection can be effective beyond many times the range of the radiating equipment. A Navy concept known as the Quiet Task Force (QTF), provides the option to shut down Navy ship sources of radiation and use land based over-the-horizon radar and other means of surveillance. This concept provides that ships go active immediately upon knowledge of imminent threat or at times when ship locations and activities are not required to be concealed.

Three gaps in this concept are (1) surface search for navigation, collision avoidance and station keeping, (2) point defense against short range low flyer attack, and (3) air traffic control capability.

Basic considerations of radar intercept resistance indicate that conventional low probability of intercept (LPI) techniques will not provide adequate intercept resistance to a radar which meets the above objectives. Conventional techniques such as high processing gain and spread spectrum, though useful for LPI communication, cannot overcome the $1/R^4$ radar signal decrease versus that the $1/R^2$ one-way intercept signal decrease. In addition, radar requirements limit the amount of signal processing gain which can be accommodated.

A signal intercept is made when the signal available, $S_a$, equals or exceeds the intercept receiver sensitivity, $S_i$. The problem now faced by Navy ships is that for actual radar transmitter power and antenna gains required for target detection, the available signal to the intercept receiver is sufficiently high that interception is limited only by the radar horizon. Interception below the horizon is possible in many situations. It has also been shown analytically that the use of very large radar processing gain cannot tip the balance in favor of the radar except for large, slow moving radar targets such as ship targets. The principal reason is the $1/R^4$ decrease in radar receiver signal power compared to the $1/R^2$ decrease in intercept receiver signal power. High signal processing gain while providing some sub-clutter visibility probably cannot be made to adequately handle high sea states. High speed targets also limit the amount of processing gain that can be used.

SUMMARY OF THE INVENTION

In accordance with the present invention, an apparatus and technique is described which provides a degree of intercept resistance by circumventing the above problems and is directed toward filling the three gaps described above plus providing limited ship/ship LPI communications. The design approach disclosed herein utilizes a K-band, LPI radar that makes use of atmospheric absorption to reduce energy at long ranges for decreased probability of intercept by enemy receivers while, at the same time, providing adequate energy at short ranges for navigation, air traffic control, and point defense. Specifically, the radar of the present invention operates at or near the lower water vapor absorption resonance frequency of 22.235 GHz. At this frequency the propagation media becomes non-linear so that the $1/R^4$ decrease in intercept signal and radar signal no longer applies.

The ability of an enemy receiver of a given sensitivity to detect a radar is a function of such factors as peak radiated power, radiated frequency, spectrum agility, and pulse repetition-frequency agility. The LPI radar of the present invention is designed to reduce probability of intercept. This is accomplished primarily by radiating frequencies which are attenuated rapidly in the atmosphere. At ranges greater than twice the target range, the intercept receiver is "looking through" more absorbing medium than is the radar. Absorption is significant at several millimeter frequencies, the lowest being 22.235 GHz. Actual atmospheric mediums are not uniform but total absorption depends upon altitude, temperature, and humidity. In accordance with the present invention, when the radar is operated at or near the water-vapor absorption frequency of 22.235 GHz, the signal energy is attenuated rapidly by the water vapor in the atmosphere.

The use of continuous-wave (CW) rf energy, coupled with a very high radar receiver antenna gain at K-band further reduces the radiated peak power. Frequency hopping techniques, as well as variable PRF, are also combined with the above concepts in order to force the interceptor to wide predetection bandwidths. The system of the present invention also provides a simple means of ship/ship communication within a limited range, e.g., 20 nm, via the radar in that messages could be encoded in frequency.

OBJECTS OF THE INVENTION

Accordingly, it is the primary object of the present invention to disclose a novel LPI radar surveillance system that overcomes the $1/R^2$ vs. $1/R^4$ law.

It is a further object of the present invention to dislcosed an LPI radar that is extremely difficult to jam.

It is another object of the present invention to disclose a novel surveillance radar that operates in a frequency range previously thought to be unsuitable for radar systems, specifically, near the lower water vapor absorption frequency of 22.235 GHz.

Other objects, advantages and novel features of the invention will become apparent from the following detailed description of the invention when considered in conjunction with the accompanying drawings.

DESCRIPTION OF THE PREFERRED EMBODIMENTS

Figure 1:
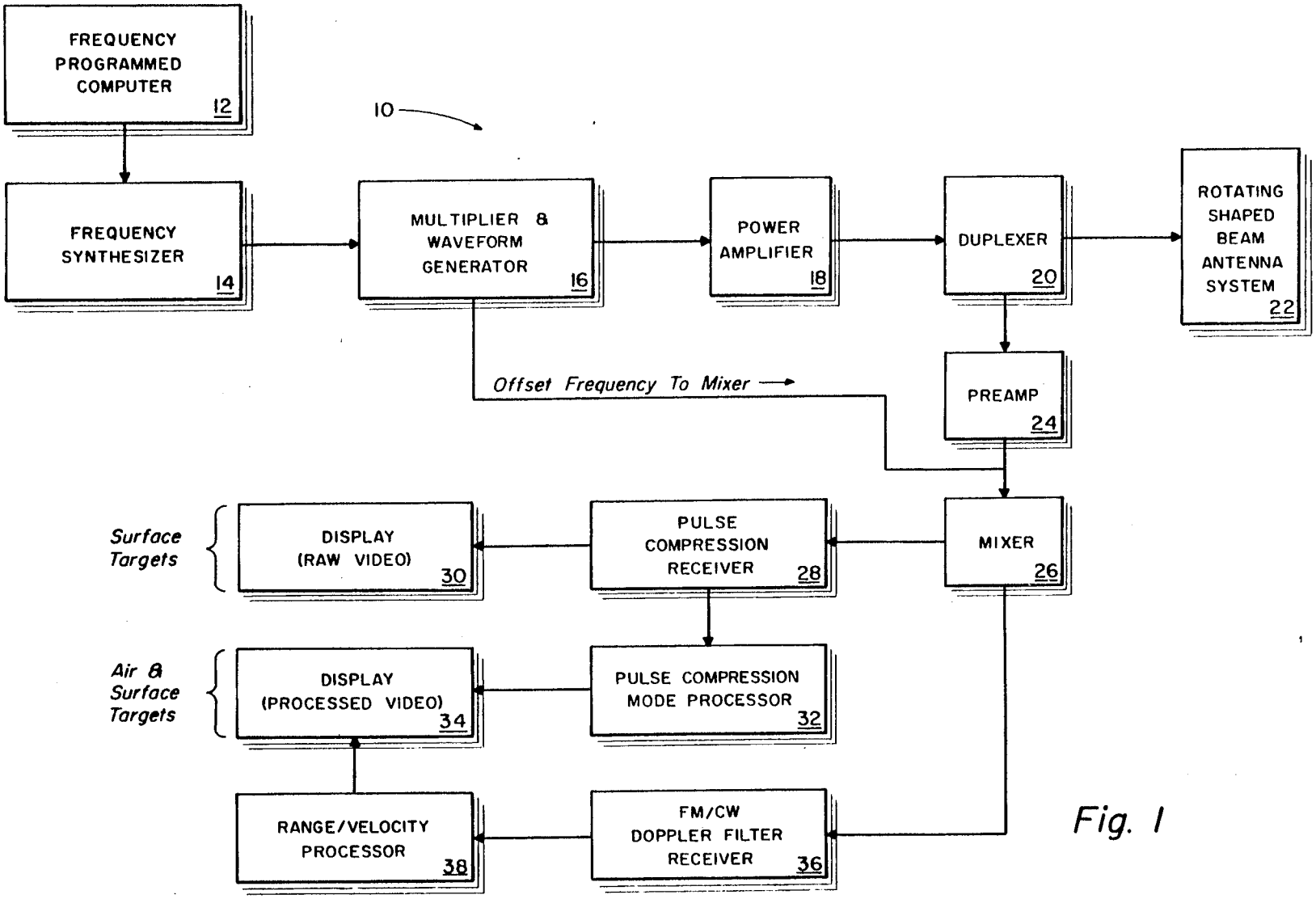
FIG. 1 is a block diagram of the LPI radar system in accordance with the present invention.

Referring now to FIG. 1 there is illustrated the LPI radar system 10 in accordance with the present invention. Frequency programmable computer 12 is used to control the frequency synthesizer 14 frequency as is well known. Frequency synthesizer 14 is a standard unit that provides a stable continuous wave, CW coherent signal source under control of the computer 12. The output of synthesizer 14 is coupled to the multiplier and waveform generator 16. Multiplier and waveform generator 16 multiples the synthesized frequency from synthesizer 14 up to the transmitted frequency and the waveform generator section modulates the synthesized frequency into a relatively high duty cycle, low PRF waveform, with linear FM modulation during each pulse to achieve reasonably good range resolution with low peak transmitted power. Power amplifier 18 amplifies the signal from the multiplier and waveform generator 16 to a suitable power level such as, for example, 1-5 KW. The power amplifier 18 may comprise, for example, a conventional klystron or TWT amplifier. Duplexer 20 transfers the transmitter power to the rotating shaped beam antenna system 22 and the received power to the receiver section of the system 10. Conventional techniques for high and low PRF duplexing may be used. The rotating shaped beam antenna system 22 may comprise, for example, a conventional search antenna design that provides a two-dimensional surface and air search beam that is sufficiently narrow and shaped in elevation to optimize the illumination of the air space for a range of 0-15 nm and an altitude of 0-3000 feet above seal level for standard atmospheric wafer vapor absorption conditions and moreover, to ensure a less than −70 dBm radar signal at 50 nm from the radar site into an intercept receiver with 10 dB antenna gain.

The receiver section of the radar system 10 is comprised of preamp 24 which provides low noise preamplification of the received signal which may have a bandwidth, for example, in the range of 18-24 GHz. The preamp 24 may be of conventional design with less than 4 db noise figure to reduce the radar transmitter power required to "see" 15 nm. Mixer 26 receives the output of preamplifier 24 and mixes the return signal with an offset frequency (local oscillator) from the multiplier and waveform generator 16 to thereby provide an IF frequency signal for receiver processing. Pulse compression receiver 28 is a conventional receiver with a matched filter for compressing the transmitted radar signal which, for example, has an uncompressed pulse switch of 20 μs to a 100 ns compressed pulse. This processor mode provides target range information to a fixed or slow moving surface targets where high PRF FM/CW waveforms would be overcome by clutter.

Display 30 may comprise, for example, a raw video PPI display of the output of the pulse compression receiver 28 and provides a visual display of detected surface targets. The pulse compression mode processor 32 comprises a computer processor that receives an input from the pulse compression receiver 28 and carries out 2-3 pulse pulse-to-pulse integration and threshold tests of detections within the target dwell time as well as scan-to-scan integration with weighting and threshold tests for a predetermined number of radar scans, e.g. five scans, in a well known manner.

The FM/CW processor 36 provides a second mode, specifically, high PRF, for air target detection where clutter environments are such that low PRF processing fails. Display means 34 displays the processed video targets in a known manner such as PPI or any other known method of displaying targets in range and bearing to the radar. Doppler filter receiver 36 receives an input from the mixer 26 and comprises a conventional high PRF pulse dopper radar receiver which detects by comparison to N thresholds in an N element doppler filter band or a FFT processor. Finally, the range/-velocity processor 38 receives its input from the doppler filter receiver 36 and may comprise a conventional high PRF pulse doppler radar processor which converts velocity detections into target range by making use of the FM portion of the high PRF waveform. The output of the range/velocity processor 38 provides an input to the display means 34 for visual display.

The frequency programming of computer 12 is set to provide, for example, a bandwidth of approximately 200 MHz centered around the mid-band operating frequency of 22.235 GHz after multiplication by the multiplier section 16. The frequency can thus be continuously varied to force enemy intercept receivers to open up their input, i.e. the predetection bandwidth, to at least 200 MHz or to force the enemy intercept receiver to adopt a frequency scan. The present approach of utilizing a frequency program computer 12 and synthesizer 14 thus permits frequency hopping when the computer 12 is programmed for hopping rates, frequency hop codes and total frequency spread in order to adapt to changing environments. For example, in heavy rain the frequency can be programmed to a low band, e.g. approximately, 18 GHz to avoid water vapor absorption and instead relying on rain absorption for covertness. Modes for various conditions can thus be set by the operator and can consist of a program change. The output of the frequency synthesizer 14 is, for instance, a 60 MHz signal which serves as the input to the multiplier and waveform generator 16. It is preferably that with a 60 MHz output from the synthesizer 14 that a twenty-five percent frequency hopping bandwidth also be provided.

The multiplier and waveform generator 16 provides three functions. 1) It multiplies the stable low frequency output of frequency synthesizer 14 up to the operating range, e.g. it multiplies the CW signals from the 60 MHz region of the synthesizer to, for example, the 18-24 GHz region for transmission 2). The unmodulated CW signal is now in the 22.235 GHz range and is further amplitude modulated to produce a pulse repetition rage of 2000 Hz with pulse widths of approximately 0.1 to 10 μs. The low PRF of approximately 2000 Hz provides for surface search applications for unambiguous ranging. The unit 16 may also provide amplitude modulation to the CW signal with a high PRF of approximately 500 KHz for short range air defense air search thus providing a velocity unambiguous radar wherein the pulse repetition rate is so high that the rate is higher than any expected doppler frequencies from the target 3. ) The last function of the waveform generator 16 is, in the low PRF mode, to perform a frequency or phase modulation on the CW signal for pulse compression in a surface search mode, i.e. it modulates the modulating pulses to achieve pulse compression within each pulse or, in the high PRF mode, the multiplier and waveform generator 16 frequency or phase modulates the FM/CW waveforms for air target detection.

Figure 2:
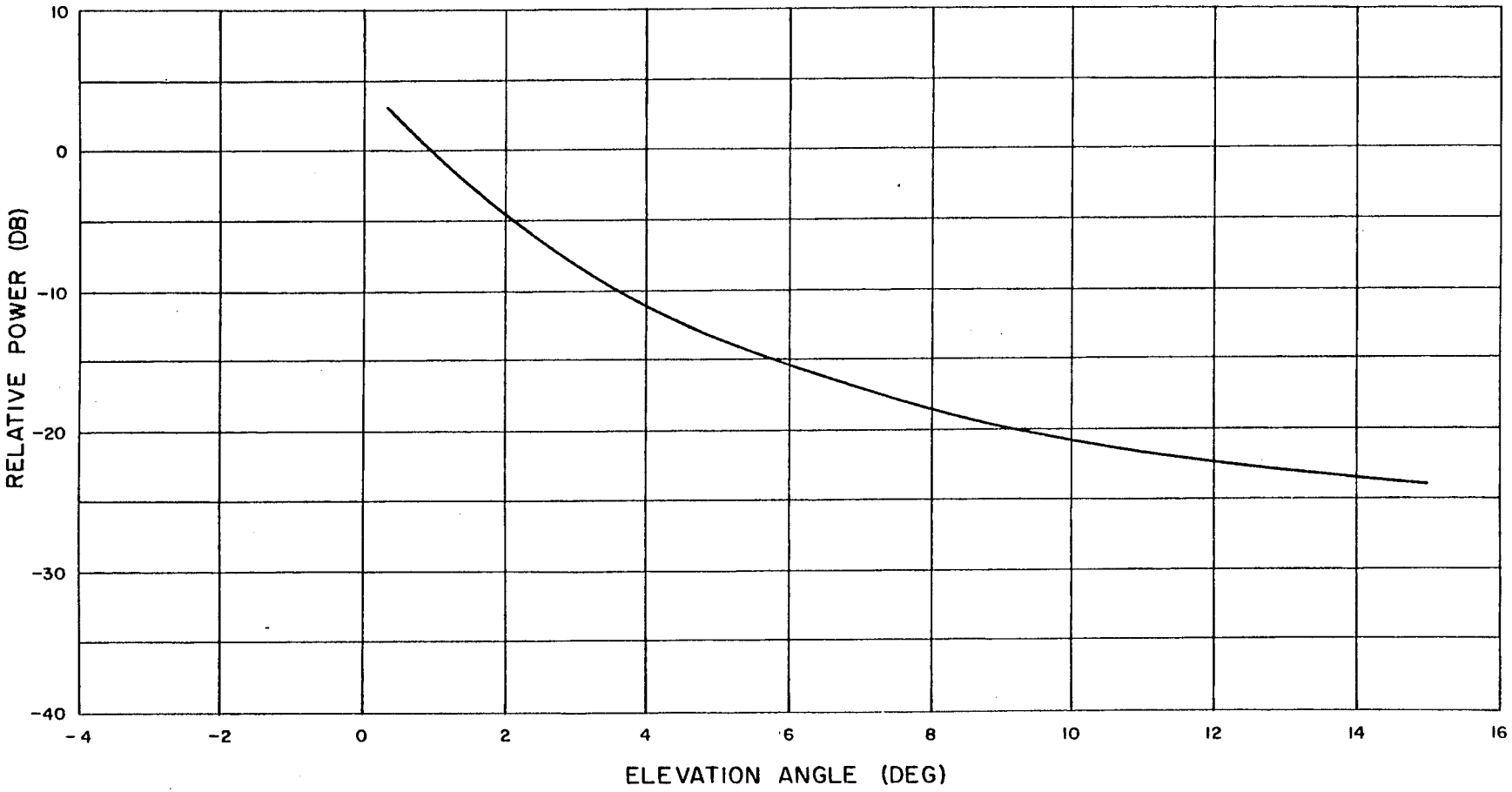
FIG. 2 is a graph illustrating the desired elevation pattern of the shaped beam antenna system of the present invention illustrating relative power plotted against elevation in angle for the optimum LPI vs. surveillance performance.

The desired elevation pattern of the reflector of the rotating shape beam antenna system 22 is illustrated in FIG. 2. It should be noted that the single dish, duplexer system illustrated in FIG. 1 could be replaced within the scope of this invention by a dual dish system without a duplexer as is well known.

Obviously many modifications and variations of the present invention are possible in the light of the above teachings. It is therefore to be understood that within the scope of the appended claims the invention may be practiced otherwise than as specifically described.

What is claimed is:

1. A method of radar surveillance with low-probability of intercept comprising the steps of:

generating a modulated waveform having a midband operating frequency of approximately the lower water vapor absorption resonance frequency of 22.2 GHz;

transmitting a beam derived from said waveform out a shaped beam antenna such that the transmitted radar beam is shaped to keep the energy uniformly distributed over low altitudes where the water vapor absorption is relatively high; and receiving, when present, and processing radar return echo signals of said transmitted waveforms.

2. The method of claim 1 wherein the step of transmitting a beam includes the step of limiting the range of said radar beam to a distance of 15 nm and an altitude of 3000 feet above sea level.

3. The method of claim 2 wherein said step of transmitting a beam includes the step of insuring that less than a −70 dbm signal will be present at a distance of 50 nm from the radar transmitting site.

4. A low probability of intercept radar system using atmospheric loss to attenuate the radar signals as seen by long range interceptors comprising:

first means for generating a modulated radar waveform having a midband frequency approximately in the region of the lower water vapor absorption frequency of 22.2 GHz;

a shaped beam radar antenna operably coupled to said first means for transmitting a beam derived from said modulated waveform over a relatively short range low altitude area; and radar receiver means for receiving and processing radar return signals from said transmitted modulated waveform.

5. The radar system of claim 4 wherein said first means include:

a frequency programmed computer;

a frequency synthesizer operably coupled to the output of said frequency programmed computer for generating a CW signal;

a waveform generator means operably coupled to said frequency synthesizer for multiplying said CW signal up to said approximate 22.2 GHz midband frequency region and for modulating said CW signal; and amplifier means operably coupled to the output of said waveform generator means for amplifying the modulated CW signal.

6. The radar system of claim 5 further including a duplexer connected between said amplifier means and said shaped beam radar antenna.

7. In a radar system including a waveform generating means for producing a modulated CW radar signal, means for transmitting a radar beam derived from said modulated CW signal and receiver means for receiving and processing radar return echo signals from said transmitted radar beam, the improvement comprising:

said waveform generating means producing said modulated CW signal such that the midband frequency of said signal is approximately in the lower water vapor absorption resonance frequency of 22.2 GHz, whereby said radar system operates as a low probability of intercept radar.

8. The system of claim 7 wherein said improvement further comprises:

said means for transmitting said radar beam is a shaped beam antenna constructed such that said transmitted radar beam is shaped to keep the energy distributed over low altitudes where the water vapor absorption is relatively high.

9. The system of claim 8 wherein said radar beam is limited to a distance of 15 nm beyond which, less than −70 dbm radar signal will be present and said radar beam is further limited to an altitude of 3000 vertical feet above sea level.

* * * * *